(12) United States Patent
Cordea

(10) Patent No.: US 8,196,958 B2
(45) Date of Patent: Jun. 12, 2012

(54) LIGHT-WEIGHT, ROLL-BONDED HEAVY DUTY TRUCK FRAME MEMBER

(75) Inventor: Thomas William Cordea, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 382 days.

(21) Appl. No.: 12/509,927

(22) Filed: Jul. 27, 2009

(65) Prior Publication Data

US 2011/0018248 A1    Jan. 27, 2011

(51) Int. Cl.
*B62D 21/02*    (2006.01)
*B62D 21/04*    (2006.01)

(52) U.S. Cl. ... 280/781; 280/800; 428/653; 296/203.01; 180/311

(58) Field of Classification Search .......... None
See application file for complete search history.

(56) References Cited

U.S. PATENT DOCUMENTS

| | | | | |
|---|---|---|---|---|
| 3,155,461 A * | 11/1964 | Hunt | ............................ | 138/148 |
| 3,350,772 A * | 11/1967 | Ulam et al. | ................... | 228/228 |
| 3,630,694 A * | 12/1971 | Enright et al. | ................ | 428/638 |
| 4,090,011 A * | 5/1978 | Barkman et al. | .............. | 428/653 |
| 4,756,464 A * | 7/1988 | Hardwick | ..................... | 228/107 |
| 5,052,845 A * | 10/1991 | Maus et al. | ..................... | 403/36 |
| 5,383,592 A * | 1/1995 | Fussnegger et al. | ......... | 228/135 |
| 5,474,331 A * | 12/1995 | Booher | ........................ | 280/789 |
| 5,655,792 A * | 8/1997 | Booher | ........................ | 280/789 |
| 6,706,239 B2 * | 3/2004 | Haack et al. | ..................... | 419/2 |
| 7,144,040 B2 * | 12/2006 | Kiehl et al. | ................... | 280/785 |
| 7,837,230 B2 * | 11/2010 | Mellis et al. | ................. | 280/781 |
| 7,971,887 B2 * | 7/2011 | Dorr et al. | ............. | 280/124.109 |
| 2006/0214412 A1 * | 9/2006 | Schmaranzer et al. | ....... | 280/781 |
| 2008/0178467 A1 | 7/2008 | Hayashi et al. | | |
| 2008/0299409 A1 * | 12/2008 | Hu | ................ | 428/601 |
| 2010/0155537 A1 * | 6/2010 | Barland et al. | ............... | 244/133 |

FOREIGN PATENT DOCUMENTS

| | | | |
|---|---|---|---|
| JP | 03-198987 | * | 8/1991 |
| JP | 06-184769 | * | 7/1994 |
| JP | 2008-006935 | * | 1/2008 |

* cited by examiner

*Primary Examiner* — John J Zimmerman
(74) *Attorney, Agent, or Firm* — Jeffrey P. Calfa; Mark C. Bach

(57) ABSTRACT

A frame member for a frame assembly of a vehicle includes a first outer steel layer, a second outer steel layer and an aluminum core layer between the first outer steel layer and the second outer steel layer. The first outer steel layer, the second outer steel layer and the aluminum core layer are metallurgically bonded together.

5 Claims, 3 Drawing Sheets

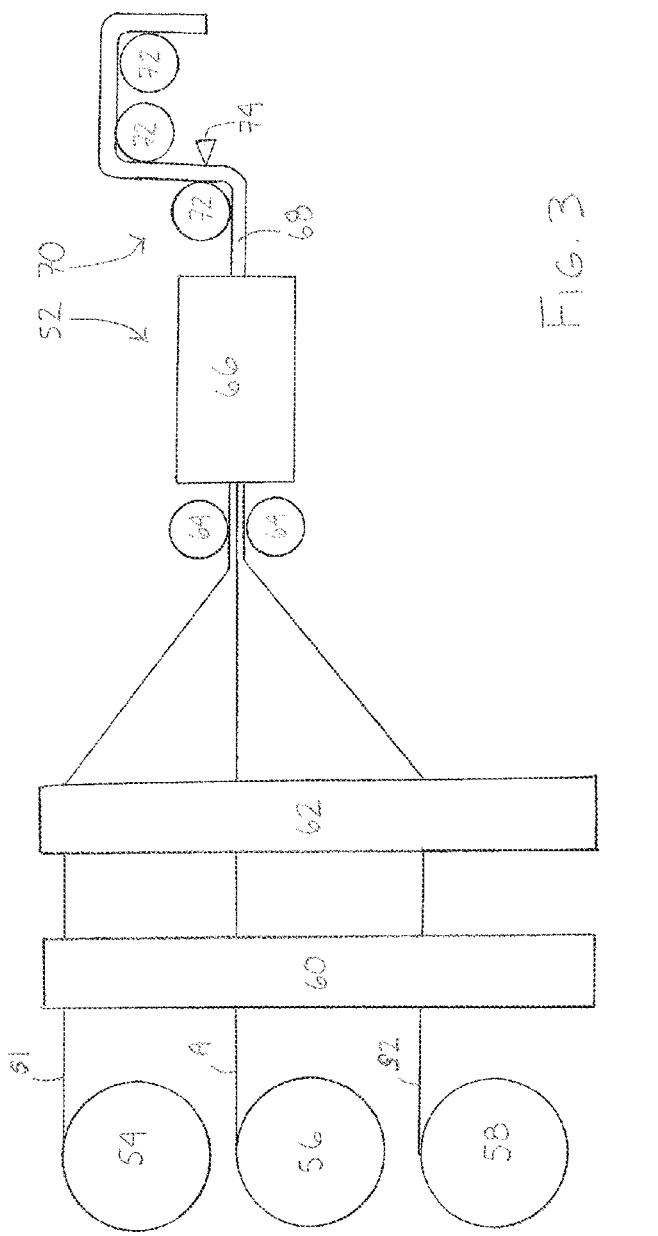

LIGHT-WEIGHT, ROLL-BONDED HEAVY DUTY TRUCK FRAME MEMBER

BACKGROUND

Embodiments described herein relate to frames for vehicles. More particularly, embodiments described herein relate to light weight and corrosion resistant frame members for vehicle frames.

Heavy-duty trucks may be built on frames that serve as supports for the truck cab, engine, transmission, and various other components. A typical full perimeter frame includes, among other components, two longitudinally extending side frame rails. The frame rails may be commonly connected to one another by several latitudinal cross members. The cross members connect the two frame rails and provide lateral and torsional rigidity to the frame. In addition to cross members, the frame rails may also provide points of attachment for other vehicle components, such as components for the vehicle suspension system, fuel tanks, exhaust system, air tanks, and other accessories.

The vehicle components and cross members may be connected to the vehicle frame rails by drilling holes from side to side through the cross members to provide support points. The vehicle components may be positioned in a particular location and mounted to the rails with mounting elements, such as bolts, nuts and brackets. The support holes may be located on the frame rails to fit the particular mounting hardware and the particular dimensions of the component being mounted.

The frame is designed to provide sufficient strength characteristics to support the vehicle with its various components. However, by increasing the size of the frame to provide strength, the frame may become heavier, and the vehicle as a whole, may become excessively heavy.

Additionally, the vehicle frame may be designed to withstand a certain amount of corrosion. The frame rails are commonly made of solid high strength low alloy (HSLA) or heat treated steels which may have been painted to resist corrosion. However, HSLA is a heavier material compared to other metals, such as aluminum which is much lighter and also considered to be more corrosion resistant than steel. To decrease the weight of the frame, extruded aluminum frame rails and stamped aluminum cross members have been used, however aluminum components may experience galvanic corrosion, particularly at the location of attachment to iron and/or steel components and castings.

SUMMARY

A frame member for a frame assembly of a vehicle includes a first outer steel layer, a second outer steel layer and an aluminum core layer between the first outer steel layer and the second outer steel layer. The first outer steel layer, the second outer steel layer and the aluminum core layer are metallurgically bonded.

BRIEF DESCRIPTION OF THE DRAWINGS

FIG. 3 is a schematic of a roll-bonding process and a roll-forming process for forming the frame member of the vehicle frame.

FIG. 4 is a schematic of a press-forming process for forming the frame member of the vehicle.

DETAILED DESCRIPTION

Figure 1:
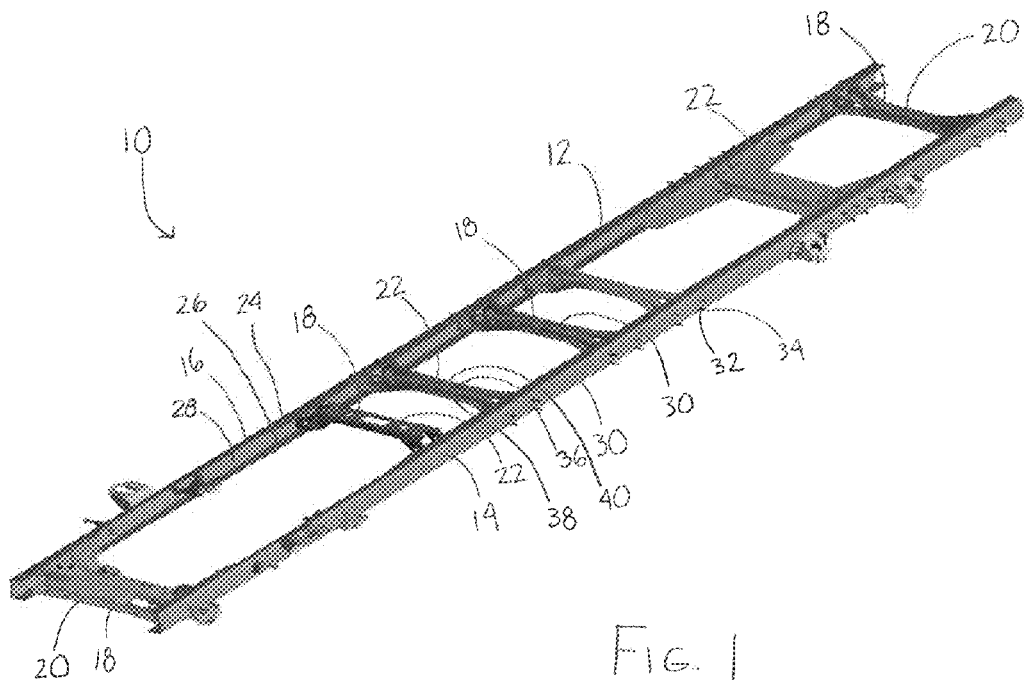
FIG. 1 is a perspective view of a vehicle frame.

Referring to FIG. 1, a frame assembly 10 is illustrated. The foundational component of the frame assembly 10 is a box frame 12 that is formed by individual frame members 30. In some embodiments, the frame assembly 10 may include a plurality of box frames 12, a box frame 12 and additional frame members 30, or a plurality of frame members 30 having various shapes, sizes and dimensions. Box frame 12 provides connection points for various components (not shown), including suspension elements, the engine, fuel tanks, the exhaust system and air tanks, and provides a base for the construction of a body.

The box frame 12 may be constructed from frame members 30 including a first frame rail 14 and a second frame rail 16, each of which run substantially the length of a vehicle (not shown). Frame rails 14 and 16 may be held parallel to one another by a series of cross members 18, arranged perpendicularly to the frame rails, although other orientations for cross members may be possible. The cross members 18 include external cross members 20 positioned across or adjacent to the forward ends and the rearward ends of frame rails 14 and 16. Located generally centrally and inwardly from the external cross members 20, may be intermediary cross members 22.

Frame rails 14 and 16 have horizontally-extending top and bottom flanges 24 and 26, respectively (visible on frame rail 16). Flanges 24 and 26 of both frame rails 14 and 16 extend inwardly toward the opposite frame rail of the box frame 12 from a web 28 of the frame rails 14 and 16. Flanges 24 and 26 provide the frame rails 14 and 16 with a cross-sectional C-shape or U-shape. In some embodiments, the frame rails 14 and 16 have a cross-sectional shape other than the C-shape or the U-shape. A plurality of holes 32 may be located through the webs 28 for receiving fasteners 34 for mounting components to the frame assembly 10, or for mounting the frame members 30 to each other.

Figure 2:
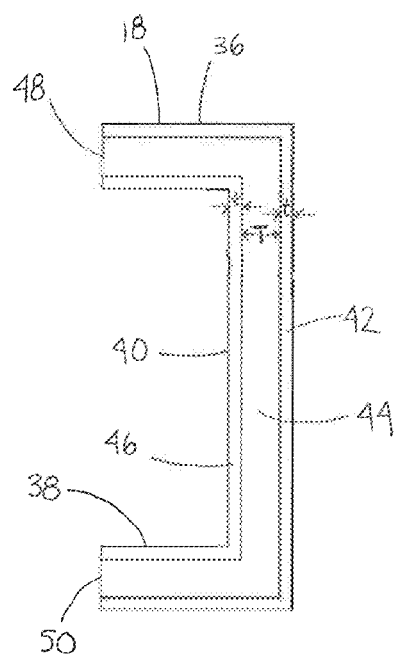
FIG. 2 is a section view of a frame member of the vehicle frame.

FIG. 2 is a section view of the frame rail 14 or 16 having a top flange 36 and a bottom flange 38, and a web 40 between the top flange and the bottom flange. With the flanges 36 and 38 and the web 40, the frame rail 14 or 16 has a cross-sectional C-shape or U-shape. In some embodiments, the frame rail 14 or 16 has a cross-sectional shape other than the C-shape or the U-shape.

The frame rail 14 or 16 has a first outer steel layer 42, an aluminum core layer 44, and a second outer steel layer 46. When viewed in cross-section, each of the layers 42, 44 and 46 has the C-shape, however other shapes may be possible. The first outer steel layer 42 has the largest C-shape, the aluminum core layer 44 has a smaller C-shape, and the second outer steel layer 46 has the smallest C-shape.

The aluminum core layer 44 has a first portion 48 and a second portion 50 that is not enclosed by the first outer steel layer 42 and the second outer steel layer 46, however it is possible that steel or some other corrosion resistive material, such as a coating, can be placed at the first portion and the second portion. In one embodiment, the aluminum core layer 44 has a thickness "T" that is at least twice as thick as the thickness "t" of each steel layer 42, 46.

Providing the frame rail 14 or 16 with the first outer steel layer 42 and the second outer steel layer 46, galvanic corrosion caused by contact of the frame rail with other metals is reduced. In some embodiments, the steel is high strength heat treatable steel, high strength low alloy (HSLA), stainless steel, or metastable austenitic stainless steel alloys. In one embodiment, the steel has a yield strength of up to 120 KSI. Further, in another embodiment, the first outer steel layer 42 and the second outer steel layer 46 may be different materials. Example steels that can be used may include Mild steel, High Strength Low Alloy steel, heat treatable steel, and stainless steels. Specifically, mild steel (28,000-38,000 psi yield strength), HSLA steel (40,000-110,000 psi yield strength), and tempered medium alloy steels (110,000-120,000 psi yield strength) may be used. Additionally, high strength stainless steel may be used (50,000->100,000 psi yield strength).

Providing the frame rail 14 or 16 with the aluminum core layer 44 between the first outer steel layer 42 and the second outer steel layer 46, the weight of the cross frame rail is reduced. In one embodiment, a high strength aluminum alloy or a heat treatable aluminum alloy is used to form the aluminum core layer 44. Example alloys that may be used include Al—Zn alloys, medium strength Al—Mg—Si alloys, Al—Mg alloys, and higher strength Al—Cu alloys. Additionally, Al—Mn alloys can be used as intermediate layers to facilitate the aluminum to steel bond interface.

While the formation of a frame member 30, with specific reference to the frame rail 14 and 16, will be discussed below, it should be appreciated that all frame members 30 of the frame assembly 10, including the cross member 18, 20, and 22, can be formed to have the first outer steel layer 42, the aluminum core 44 and the second outer steel layer 46. Further, while only the formation of the C-shape is discussed below, it should be appreciated that other cross-sectional shapes may be formed.

Referring now to FIG. 3, the frame member 30 may be formed by a roll-bonding process, indicated generally at 52. Coils 54, 56, 58 of the materials (metals or alloys) S1, A, S2 forming each of the first outer steel layer 42, the aluminum core layer 44 and the second outer steel layer 46, respectively, may be cleaned with chemicals at a cleaner 60. S1 refers to the steel material (metals or alloys) that forms the first outer steel layer 42, A refers to the aluminum material (metals or alloys) that forms the aluminum core layer 44, and S2 refers to the steel material (metals or alloys) that forms the second outer steel layer 46.

The cleaned materials may be abraded, for example by brushing or sanding with fine-grit, at an abrader 62. The abraded materials may be rolled together under a continuous high pressure at a first roller 64, and the high pressure metallurgically bonds the materials together. It should be noted that pressure sufficient to cause intimate contact and/or deformation of the contact surfaces of metals to be bonded is, at a minimum, needed to form a suitable bond. The bonded materials may be heated at a heater 66 to allow diffusion of the materials to occur, which improves the bond strength between the materials. After bonding, the three material layers form a cladded strip 68. In one embodiment, the cladded strip 68 is a strip of steel-aluminum-steel layers 42, 44, 46, respectively.

Figure 5:
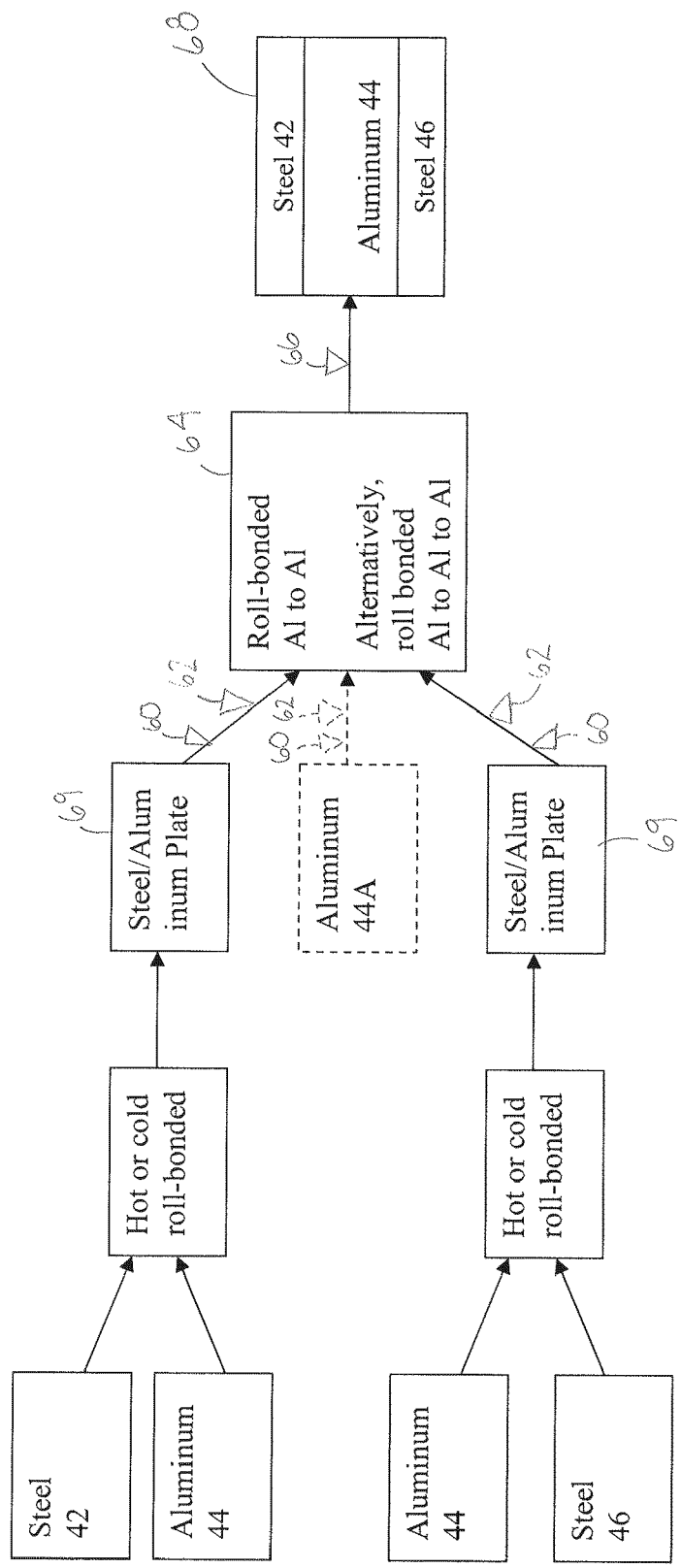
FIG. 5 is a schematic of a roll-bonding process for forming a strip.

Referring to FIG. 5, it is possible that the aluminum core layer 44 may be formed by first cold or hot roll-bonding an aluminum alloy to each of the outer steel layers 42, 46 to form pre-bonded steel/aluminum bi-metallic plates 69 that would then be roll-bonded together to form the strip 68. Roll-bonding the two steel/aluminum plates 69 together at the aluminum layer 44 allows a metallurgical bond to be made between the aluminum layers, as opposed to the aluminum-steel interface, which may permit lower pressures during roll-bonding 64 due to aluminum being a softer material than steel. Alternatively, the two steel/aluminum plates 69 could be roll-bonded to a third intermediate aluminum alloy layer 44A, such that the final metallurgical bond or bonds are formed between the aluminum alloys 44, 44A. Thus, the two or more aluminum layers 44, 44A would comprise the "aluminum core" layer 44 of the strip 68. It is possible that the aluminum alloy 44A could be a higher strength aluminum, for example a 5000 series alloy, a 6000 series alloy, or a 2000 series alloy, and the aluminum alloy 44 could be a softer alloy, for example a 3000 series Aluminum-Manganese alloy.

Referring back to FIG. 3, the cladded strip 68 is then roll-formed into the C-shape of the frame member 30, such as the frame rail 14 or 16, using a roll-forming process, indicated generally at 70. The cladded strip 68 is formed or bent into the C-shape of the frame member 30 by feeding the cladded strip between successive pairs of second rollers 72. During the roll-forming process 70, only bending of the cladded strip 68 occurs until the C-shape is achieved. The formed, cladded strip 68 is cut at a cutter 74 to form individual frame members 30. The roll-forming process 70 provides both rigidity and strength to the material forming the frame member 30.

Alternatively, and referring to FIG. 4, the cladded strip 68 can be press-formed into the C-shape or other stamped shape of the frame member 30 using a press-forming process 76. The cladded strip 68 is stamped or pressed using dies and/or punches 78 to form the C-shape. Using either the press-forming process 76 or the roll-forming process 70, after the C-shape is formed, the formed frame member 30 can be pierced or drilled for component mounting. In one embodiment, the frame members 30 can be heat treated to achieve higher strength characteristics of the materials.

The frame member 30 is assembled to at least one other side rail or one other cross member 18 to form the frame assembly 10. The fasteners 34 may be used to assemble the frame members 30, or alternatively, welds may be used. In one embodiment, all of the frame members 30 of the frame assembly 10 may have the first outer steel layer 42, the aluminum core 44 and the second outer steel layer 46. In another embodiment, one or more of the frame members 30 may have the first outer steel layer 42, the aluminum core 44 and the second outer steel layer 46.

Providing a first outer steel layer 42 and a second outer steel layer 46 on either side of an aluminum core layer 44 reduces galvanic corrosion at the frame members 30, and also reduces the weight of the frame members while also providing the strength and stiffness properties of conventional frame members. Additionally, since the roll-forming process 70 and the press-forming process 76 do not require heat treatment, warping caused by the current quenching operation of steel frame members can be reduced or eliminated.

What is claimed is:

1. A frame assembly for a vehicle, comprising:

two frame rails that extend parallel to one another, wherein each of the two frame rails are C-shaped in cross-section and each comprises a vertically-extending web, a horizontally-extending top flange extending from the web, and a horizontally-extending bottom flange extending from the web;

wherein each of the frame rails has a first outer steel layer, a second outer steel layer, and an aluminum core layer metallurgically roll-bonded between the first outer steel layer and the second outer steel layer to form a C-shape in cross-section;

wherein in cross-section, the first steel layer and the second steel layer are coextensive with the aluminum core layer over the frame rails with exception to a first portion and a second portion at ends of the C-shape that are not enclosed the first steel layer and the second steel layer;

a plurality of cross-members that extend transversely between and are fixedly attached to the two frame rails.

2. The frame assembly of claim 1 wherein the plurality of cross-members are formed with the first outer steel layer, the second outer steel layer, and the aluminum core layer.

3. The frame assembly of claim 1 wherein the first outer steel layer and the second outer steel layer are formed of one of high strength heat treatable steel, high strength low alloy, stainless steel, and metastable austenitic stainless steel alloys.

4. The frame assembly of claim 1 wherein the aluminum core layer is formed of one of high strength aluminum alloy and heat treatable aluminum alloy.

5. The frame assembly of claim 1 wherein the thickness of the aluminum core layer is at least twice as thick as the thickness of the first outer steel layer in cross-section.

* * * * *